March 26, 1957 — E. B. TOZLOSKI — 2,786,549
VEHICLE LIFT
Filed Feb. 11, 1955
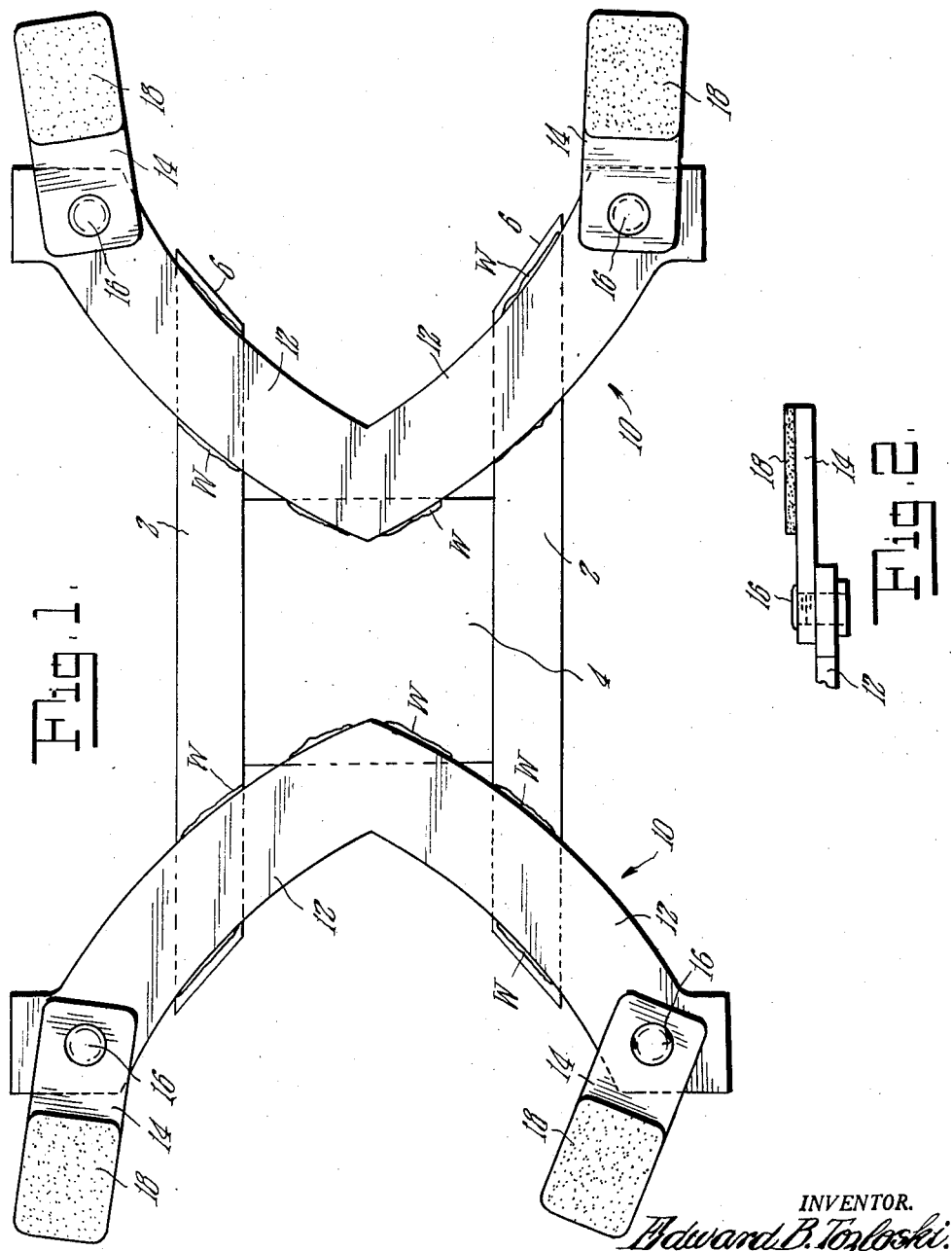
INVENTOR.
Edward B. Tozloski

2,786,549

VEHICLE LIFT

Edward B. Tozloski, Sunderland, Mass., assignor to Edbar Products, Inc., Sunderland, Mass., a corporation of Massachusetts Application February 11, 1955, Serial No. 487,540

2 Claims. (Cl. 187—8.41)

This invention relates to improvements in vehicle lift apparatus.

The principal object of the invention is directed to the provision of means for a vehicle lift to adapt the same for use with present day vehicles.

Vehicle lifts usually include elongated side rails rigidly connected in spaced parallel relation to a transverse member intermediate opposite ends thereof but are not adequate or convenient to engage below many automobiles and trucks. Present day automobiles and trucks have numerous depending components and parts and some vehicles are of relatively narrow tread. In elevating the vehicle the side rails are likely to engage depending components or parts. It is difficult if not impossible to position the vehicle on the lift in such a manner that the rails may engage and lift on the vehicle chassis alone. Furthermore due to the construction of the underside of vehicles the end portions of the side rails interfere with the service man in his work on the vehicle underside.

According to this invention similar supporting members are provided which are secured to the side rails and transverse member of a lift and opposite ends of the side rails are cut off.

The supporting members include side arms which diverge from the transverse member and outwardly of outer sides of the side rails have supports pivoted on outer ends thereof. The supports are swingable in horizontal planes so that they may be located under any part of the vehicle desired. By cutting off the ends of the side rails there is adequate room for the workman at opposite ends of the vehicle.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of the novel features of the invention associated with the side rails and transverse member of a lift; and Fig. 2 is an edge view of an end portion of one of the side arms of a supporting member having a support pivotally connected thereto.

Referring now to the drawings more in detail, the invention will be fully described.

The side rails 2 and transverse member 4 of an ordinary lift are shown in Fig. 1. The member 4 is usually mounted on top of hydraulic means which raises and lowers the structure.

According to the invention opposite end portions of the side rails are removed as by cutting said rails so that the ends 6 are more nearly adjacent the transverse member than formerly.

Similar primary supporting members 10 are provided which have relatively diverging side arms 12. These members 10 are preferably formed from rather heavy metal plate for strength and rigidity.

The members 10 are disposed on the lift parts and are secured thereto in a suitable manner as by welding indicated by W.

The members are in back-to-back relation on the lift, as shown, so that the side arms 12 extend in diverging relation from the transverse member 4 and outwardly beyond the side rails.

Elongated secondary supports 14 are pivotally connected at one end to outer portions of the side arms by bolts such as 16. Said supports 14 will preferably be formed from metal plate for rigidity and strength and they may be locked in place by tightening of the bolts 16.

By being pivoted as they are the supports 14 are swingable in horizontal planes to any radial position so they may be positioned to underlie that part of the vehicle desired for lifting purposes.

The supports 14 are provided with cushion pads 18 secured thereto. These pads may be formed from leather, rubber, rubber composition, or whatever may be desired.

By means of the apparatus the supports 14 are adapted to underlie any desired part of the vehicle and so that the lift is adapted to accommodate vehicles of various dimensions and types not possible by prior art lifts.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. Unitary vehicle lifting apparatus comprising in combination, a pair of elongated relatively parallel and transversely spaced side rails having upper horizontal surfaces, a transverse connecting member connected at opposite ends thereof to said rails intermediate opposite ends thereof, a pair of similar flat primary supporting members each being generally in the form of a V having side arms relatively diverging from an apex portion thereof, said supporting members disposed on the horizontal surface of the side rails and connecting member with the apex portions thereof in adjacent spaced relation on and said connecting member and the side arms thereof extending in opposite directions away from said apex portions and across end portions of the upper surfaces of the said rails at opposite ends thereof, said side arms of the supporting members extending outwardly laterally from opposite ends of said side rails and said side arms and apex portions of the supporting members being secured to said connecting member and opposite end portions of said rails, and elongated secondary supports having inner end portions pivotally connected to outer portions of the side arms of the primary supporting members for swinging in a horizontal plane throughout a complete circle.

2. Unitary vehicle lifting apparatus comprising in combination, a pair of elongated side rails having upper horizontally disposed surfaces, a connecting member connected at opposite ends to intermediate portions of said rails spacing said rails in transverse parallelism, a pair of similar flat primary supporting members each being generally in the form of a V having an apex and a pair of elongated arms diverging therefrom, apex portions of said primary members being disposed adjacent one another on opposite end portions of said connecting member and the arms of said members extending outwardly from said apex portions with the arms of said members extending in opposite directions and across the upper surface of the rails at opposite ends thereof, said apex portions and arms of the primary members being secured to said connecting member and rails, outer ends of the arms of the primary members extending outwardly from the sides of the rails, and elongated secondary supporting members having inner ends pivoted to outer end portions of said arms of the primary members for swinging in horizontal planes throughout a complete circle.

References Cited in the file of this patent

UNITED STATES PATENTS 2,713,922     Harrison _____ July 26, 1955

FOREIGN PATENTS 497,847     Belgium _____ Dec. 26, 1950